United States Patent [19]
Murata et al.

[11] Patent Number: 6,071,849
[45] Date of Patent: Jun. 6, 2000

[54] CATALYST FOR OXIDATIVE CONDENSATION OF LOWER ALIPHATIC HYDROCARBON AND METHOD OF CONDENSING LOWER ALIPHATIC HYDROCARBON USING SAME

[75] Inventors: Kazuhisa Murata; Takashi Hayakawa; Kunio Suzuki; Satoshi Hamakawa, all of Tsukuba, Japan

[73] Assignee: Director-General of Agency of Industrial Science and Technology of Japan

[21] Appl. No.: 09/261,492

[22] Filed: Mar. 3, 1999

[30] Foreign Application Priority Data

Mar. 10, 1998 [JP] Japan .................................. 10-058468

[51] Int. Cl.$^7$ ..................................................... B01J 23/00
[52] U.S. Cl. ......................... 502/305; 502/308; 502/311; 502/314; 502/315; 502/312; 585/418; 585/421
[58] Field of Search ..................................... 502/305, 308, 502/311, 312, 314, 315; 585/418, 421

[56] References Cited

U.S. PATENT DOCUMENTS

| | | | |
|---|---|---|---|
| 3,893,947 | 7/1975 | Young ...................................... | 252/439 |
| 4,130,507 | 12/1978 | Hayes ...................................... | 252/439 |
| 4,748,143 | 5/1988 | Tabala et al. ............................ | 502/304 |
| 5,015,461 | 5/1991 | Jacobson et al. ........................ | 423/593 |
| 5,105,053 | 4/1992 | Jacobson et al. ........................ | 585/658 |
| 5,108,977 | 4/1992 | Yoshida et al. .......................... | 502/304 |
| 5,236,692 | 8/1993 | Nagashima et al. ..................... | 423/584 |
| 5,304,688 | 4/1994 | Bowman et al. ........................ | 568/727 |
| 5,413,984 | 5/1995 | Marecot et al. ......................... | 502/333 |
| 5,427,993 | 6/1995 | Perry et al. .............................. | 502/328 |

*Primary Examiner*—Tom Dunn
*Assistant Examiner*—Cam N. Nguyen
*Attorney, Agent, or Firm*—Lorusso & Loud

[57] ABSTRACT

A catalyst for the oxidative condensation of a lower aliphatic hydrocarbon including a carrier of a solid, oxide superacid, and at least one transition metal compound and at least one alkali metal compound supported on the carrier. By contacting a lower aliphatic hydrocarbon with oxygen in the presence of the above catalyst, a hydrocarbon with an increased carbon number can be obtained.

13 Claims, No Drawings

CATALYST FOR OXIDATIVE CONDENSATION OF LOWER ALIPHATIC HYDROCARBON AND METHOD OF CONDENSING LOWER ALIPHATIC HYDROCARBON USING SAME

BACKGROUND OF THE INVENTION

This invention relates to a catalyst for the oxidative condensation of a lower aliphatic hydrocarbon and a method of condensing a lower aliphatic hydrocarbon using the above catalyst.

A number of studies have been made on developing techniques for the catalytic conversion of methane into ethylene by oxidative condensation thereof. Examples of catalysts for use in such oxidative condensation include (a) supported catalysts containing Pb, Sn, Sb, Bi or Mn as catalytic components (J. Catal., 73, 9(1982); (b) an alkaline earth metal oxide such as MgO, CaO, BeO or SrO mixed with a compound of an alkali metal such as Li, Na or Rb (T. Ito and J. H. Lunsford, Nature, 314, 25(1985); (c) A transition metal oxide mixed with an alkali metal chloride such as LiCl and NaCl (Chem. Lett., 1986, 903); (d) a halogen-modified alkaline earth metal oxide (Chem. Lett., 1987, 2157); (e) a rare earth metal oxide or a composite oxide thereof (Chem. Lett., 1985, 499; J. Chem. Soc., Chem. Commun., 1987, 1639); and (f) zirconia having supported thereon a lithium-modified sulfate group.

These known catalysts, however, are not fully satisfactory with respect to selectivity to condensed hydrocarbons, yield and catalyst life.

SUMMARY OF THE INVENTION

It is, therefore, an object of the present invention to provide a catalyst for use in oxidative condensation of a lower aliphatic hydrocarbon.

Another object of the present invention is to provide a catalyst of the above-mentioned type which gives both a high selectivity to condensed hydrocarbons and a high yield and which has a long service life.

It is a further object of the present invention to provide a method for the oxidative condensation of a lower aliphatic hydrocarbon.

In accomplishing the foregoing object, there is provided in accordance with the present invention a catalyst which comprises a carrier including a solid, oxide superacid, and at least one transition metal compound and at least one alkali metal compound supported on said carrier.

In another aspect, the present invention provides a method of condensing a lower aliphatic hydrocarbon, comprising contacting the lower aliphatic hydrocarbon with oxygen in the presence of which compises a carrier including a solid, oxide superacid, and at least one transition metal compound and at least one alkali metal compound supported on said carrier.

Other objects, features and advantages of the present invention will become apparent from the detailed description of the preferred embodiments of the invention to follow.

DETAILED DESCRIPTION OF THE PREFERRED EMBODIMENTS OF THE INVENTION

The catalyst according to the present invention comprises a carrier including a solid, oxide superacid, and catalytic metal components supported on the carrier and including at least one transition metal compound and at least one alkali metal compound.

The oxide superacid preferably comprises an inorganic refractory oxide and a second metal oxide composited with the refractory oxide. The inorganic refractory oxide may be oxides of a metal such as Al, Si, Sn, Pb, Ti, Zr, Hf, Fe, Co, Ni. Illustrative of suitable refractory oxides include aluminum oxide, hafnium oxide, zirconium oxide (zirconia), silica, tin oxides ($SnO_2$, SnO) and iron oxides ($Fe_2O_3$, $Fe_3O_4$). These oxides may be used singly or in combination of two or more thereof. The use of zirconia is especially preferred.

It is preferred that the refractory oxide be amorphous. An amorphous refractory metal oxide may be obtained by providing an aqueous solution of a compound of the metal such as a salt or an alkoxide, hydrolyzing the metal compound in the presence of an acid or alkali to precipitate hydroxide of the metal, and precipitating and drying the precipitates. The dried precipitates are then calcined while preventing crystallization at 200–350° C., preferably 250–300° C.

The second metal oxide composited with the refractory oxide may be, for example, an oxide of a metal of Group 3A or 6B, preferably molybdenum oxide, tungsten oxide or boron oxide. The second metal oxide may be composited with the refractory oxide by impregnating or kneading the refractory oxide with an aqueous solution of a compound of the metal, followed by drying and calcination. The metal compound used as a raw material for the second metal oxide may be, for example, ammonium molybdate $[(NH_4)_6Mo_7O_{24}] \cdot 4H_2O$, ammonium phosphomolybdate $[(NH_4)_3PMo_{12}O_{40}] \cdot xH_2O$, ammonium metatungstate $[(NH_4)_6(H_2W_{12}O_{40})] \cdot xH_2O$, ammonium 12metatungstate $[(NH_4)_{10}W_{12}O_{42}H_2] \cdot 10H_2O$, ammonium dodecatungstophosphate $[(NH_4)_3PW_{12}O_{40}] \cdot 14H_2O$, trimethyl borate and orthoboric acid.

The amount of the second metal oxide composited to the refractory oxide is generally 1–30% by weight based on the weight of the refractory oxide. Preferably, the amount of the second metal oxide is 1–15% by weight, more preferably 3–8% by weight, in the case of molybdenum oxide, 5–30% by weight, more preferably 10–20% by weight, in the case of tungsten oxide and 1–10% by weight, more preferably 3–6% by weight, in the case of boron oxide. The calcination is generally performed at 500–900° C. The calcination temperature is preferably 700–900° C., more preferably 750–850° C., in the case of molybdenum oxide, 700–900° C., more preferably 750–850° C., in the case of tungsten oxide and 500–800° C., more preferably 550–750° C., in the case of boron oxide.

At least one transition metal compound and at least one alkali metal compound are supported on the oxide superacid. The transition metal compound is preferably present in the form of an oxide or a composite oxide. The alkali metal compound is preferably present in the form of a halide, such as a chloride, or an oxide.

Any transition metal generally used as an oxide catalyst may be suitably used for the purpose of the present invention. Illustrative of suitable transition metals are Mn, Ti, Fe, Co, Cr, V, Ni, Si, Ce, Sm, Eu, Yb, Er, Nd, Ru, Y, Gd and La. These metals may be used singly or in combination of two or more thereof. Illustrative of suitable alkali metals are Li, Na, K, Rb and Cs. These metals may also be used singly or in combination of two or more thereof.

The transition metal compound is preferably present in an amount of 0.2–50 parts by weight, preferably 2–20 parts by weight, in terms of elemental metal, per 100 parts by weight of the refractory oxide. The alkali metal compound is preferably present in an amount of 1–30 parts by weight, more preferably 3–10 parts by weight, in terms of an elemental metal, per 100 parts by weight of the refractory oxide.

The transition metal compound and the alkali metal compound can be supported on the oxide superacid simultaneously or separately in either order. Any conventionally employed method, such as a physical mixing method, an impregnating method, a kneading method, a precipitation method or an incipient wetness method, may be suitably used for supporting the transition metal compound and the alkali metal compound. If desired, the transition metal compound and/or the alkali metal compound can be supported on the oxide superacid during the preparation of the oxide superacid.

As a raw material for the supported transition metal compound, there may be used, for example, a hydroxide, a carbonate, an acetate, a nitrate, a phosphate, a chloride or a sulfate. These raw material are generally used in the form of an aqueous solution. As a raw material for the supported alkali metal compound, there may be used, for example, a hydroxide, a carbonate, an acetate, a nitrate, a phosphate, a chloride, a bromide or a sulfate.

The oxide superacid supporting transition metal and alkali metal compounds thereon is generally calcined at a temperature of 500–1,000° C., preferably 700–900° C., for 3–20 hours.

A lower aliphatic hydrocarbon is condensed in the presence of oxygen and a catalytically effective amount of the above catalyst. The aliphatic hydrocarbon preferably has 1–6 carbon atoms, more preferably 1–4 carbon atoms. Examples of suitable lower aliphatic hydrocarbon include methane, ethane, propane and butane.

The catalytic condensation is preferably performed at a temperature of 600–900° C. under an ambient pressure, a reduced pressure or a pressurized condition. Oxygen is preferably used in an amount of 0.1–10 mol, more preferably 0.25–1 mol, per mole of the lower aliphatic hydrocarbon. If desired, the lower aliphatic hydrocarbon feed may be diluted with an inert gas such as nitrogen or helium.

When methane is used as the raw material hydrocarbon, $C_2$ hydrocarbons such as ethane, ethylene and acetylene are produced as a main product. As by-products, a small amount of $C_3$ hydrocarbons, $C_4$ hydrocarbons, $C_5$ hydrocarbons and benzene are also produced.

The following examples will further illustrate the present invention

EXAMPLE 1

Zirconyl sulfate (10 g) was dissolved in 250 ml of distilled water and the solution was heated to 80° C., to which aqueous ammonia (25 ml) was added dropwise to precipitate zirconium hydroxide. The precipitates are filtered, washed and dried overnight at 100° C. to obtain 5.72 g of zirconium hydroxide. This was then pre-calcined at 300° C. for 3 hours to obtain 5.04 g of zirconium hydroxide having BET surface area of 252.8 m$^2$/g. A quantity (1.2 g) of the thus obtained zirconium hydroxide was mixed with 0.210 g of ammonium metatungstate [(NH$_4$)$_6$(H$_2$W$_{12}$O$_{40}$)] (13% by weight in terms of elemental W) and 250 ml of distilled water and the mixture was stirred at 80° C. for 3 hours. The resulting mixture was heated to dryness, allowed to stand at 100° C. overnight and calcined at 830° C. for 3 hours to obtain 1.11 g of oxide superacid (ziroconia composited with tungsten oxide having a BET surface area of 60.8 m$^2$/g. This was mixed with an aqueous solution obtained by dissolving 0.116 g of manganese nitrate (2% by weight as elemental Mn) and 0.236 g of sodium chloride (8.2% by weight in terms of elemental Na) and the mixture was stirred at 80° C. for 3 hours. The resulting mixture was heated to dryness, allowed to stand at 100° C. overnight and calcined at 700° C. for 3 hours to obtain 1.29 g of a catalyst (oxide superacid supporting thereon manganese oxide and sodium chloride) having a BET surface area of 8.5 m$^2$/g. The catalyst had Mn and Na contents of 2% by weight and 21% by weight, respectively, based on the weight of the zirconia.

EXAMPLES 2–4

Example 1 was repeated in the same manner as described except that the amount of ammonium metatungstate was changed so that the catalyst obtained had a tungsten oxide content of 2% by weight (Example 2), 5% by weight (Example 3) or 20% by weight (Example 4), in terms of elemental W.

COMPARATIVE EXAMPLE 1

Example 1 was repeated in the same manner as described except that ammonium metatungstate was not used at all.

COMPARATIVE EXAMPLE 2

Example 1 was repeated in the same manner as described except that sodium chloride was not used at all.

EXAMPLE 5

Example 1 was repeated in the same manner as described except that ammonium molybdate was used in place of metatungstate in an amount of 5% by weight in terms of elemental Mo.

EXAMPLES 6–10

Example 1 was repeated in the same manner as described except that manganese nitrate was replaced by cobalt nitrate (Example 6), nickel nitrate (Example 7), iron nitrate (Example 8), chromium nitrate (Example 9) or titanium tetraisopropoxide (Example 10). The amount of each of these transition metal nitrates was 2% by weight in terms of elemental Co, Ni, Fe, Cr or Ti.

EXAMPLE 11

Example 1 was repeated in the same manner as described except that samarium nitrate was used in place of manganese nitrate in an amount of 6% by weight in terms of elemental Sm and that the amount of NaCl was increased to 23.3% by weight in terms of elemental Na.

EXAMPLE 12

Example 1 was repeated in the same manner as described except that cerium nitrate was used in place of manganese nitrate in an amount of 6% by weight in terms of elemental Ce and that the amount of NaCl was increased to 23.3% by weight in terms of elemental Na.

EXAMPLE 13

Example 1 was repeated in the same manner as described except that tetraethoxysilane was used in place of manganese nitrate in an amount of 2% by weight in terms of elemental Si.

EXAMPLES 14–19

Example 12 was repeated in the same manner as described except that cerium nitrate was replaced by lanthanum nitrate (Example 14), neodymium nitrate (Example 15), europium nitrate (Example 16), yttrium nitrate (Example 17), ytterbium nitrate (Example 18) or gadolinium (Example 19). The amount of each of these transition metal nitrates was. 6% by weight in terms of elemental La, Nd, Eu, Y, Yb or Gd.

EXAMPLES 20–22

Example 1 was repeated in the same manner as described except that NaCl was replaced by RbCl, CsCl or LiCl. The amount of each of these alkali metal chlorides was 6% by weight in terms of elemental Rb, Cs or Li.

EXAMPLE 23

Example 1 was repeated in the same manner as described except that cerium nitrate was used in place of manganese nitrate in an amount of 10% by weight in terms of elemental Ce, that $Li_2CO_3$ was used in place of NaCl in an amount of 5% by weight in terms of elemental Li, and that the calcination was performed at 850° C. for 16 hours.

COMPARATIVE EXAMPLE 3

Example 23 was repeated in the same manner as described except that cerium nitrate was not used at all.

EXAMPLE 24

Example 23 was repeated in the same manner as described except that manganese nitrate was used in place of cerium nitrate in an amount of 5% by weight in terms of elemental Mn.

EXAMPLE 25

Example 23 was repeated in the same manner as described except that manganese nitrate was used in place of cerium nitrate in an amount of 10% by weight in terms of elemental Mn and that sodium pyrophosphate was used in place of $Li_2CO_3$ in an amount of 45% by weight in terms of elemental Na.

EXAMPLE 26

Example 23 was repeated in the same manner as described except that a combination of manganese nitrate with cerium nitrate was used in place of cerium nitrate in an amount of 10% by weight in terms of elemental Ce and 2% by weight in terms of elemental Mn and that sodium pyrophosphate was used in place of $Li_2CO_3$ in an amount of 45% by weight in terms of elemental Na.

EXAMPLE 27

Example 23 was repeated in the same manner as described except that europium nitrate was used in place of cerium nitrate in an amount of 10% by weight in terms of elemental Eu.

EXAMPLE 28

A quantity (1.2 g) of the zirconium hydroxide obtained in Example 1 was mixed with 0.210 g of ammonium metatungstate $[(NH_4)_6 (H_2W_{12}O_{40})]$ (13% by weight in terms of elemental W), 0.28 g (9.2% by weight in terms of elemental Na) of sodium chloride and 250 ml of distilled water and the mixture was stirred at 80° C. for 3 hours. The resulting mixture was heated to dryness, allowed to stand at 100° C. overnight and calcined at 830° C. for 3 hours to obtain 1.63 g of oxide superacid (ziroconia composited with tungsten oxide and NaCl). This was mixed with an aqueous solution obtained by dissolving 0.303 g of cerium nitrate (6% by weight as elemental Ce) and 0.38 g (9.2% by weight in terms of elemental Na) of sodium chloride, and the mixture was stirred at 80° C. for 3 hours. The resulting mixture was heated to dryness, allowed to stand at 100° C. overnight and calcined at 850° C. for 16 hours to obtain 1.9 g of a catalyst (oxide superacid supporting thereon cerium oxide and sodium chloride). The catalyst had Ce and Na contents of 6% by weight and 13.7% by weight, respectively, based on the weight of the zirconia.

EXAMPLE 29

The catalyst (0.5 g) obtained in Example 1 was packed, together with 2 g of silica flour, in a quartz reaction column to form a packed bed. While passing a nitrogen gas at a rate of 50 ml/minute, the packed bed was heated at a rate of 8° C. per minute and maintained at 600° C. for 1 hour. Then, a raw material feed containing 10% by volume of nitrogen, 5% by volume of oxygen and 85% by volume of methane was passed through the pretreated packed bed at a rate of 50 ml per minute, while heating the bed to 750° C. at a rate of 4° C. per minute. The raw material feed was continued to be passed through the packed bed while maintaining the bed at that temperature. The product obtained at a stage 1 hour after the maintenance of the temperature at 750° C. was analyzed by gas chromatography. The results of the analysis are as follows:

| | |
|---|---|
| Methane conversion [C(M)]: | 45.9% |
| Selectivity to $C_2$ (ethane + ethylene + acetylene) based on methane [S($C_2$)]: | 62.9% |
| Yield of $C_2$ based on methane [($C_2$)]: | 28.8% |
| Selectivity to $CO_X$ (CO + $CO_2$) [S($CO_X$)]: | 20.5% |
| Yield of $CO_X$ [Y($CO_X$)]: | 9.4% |

Additionally, $C_3$, $C_4$ and $C_5$ hydrocarbons and benzene were also detected in a small amount.

The above conversion and yield are calculated as follows:
(1) Methane conversion [C(M)]=A/(A+B)×100%
   where A: amount of the product
   B: amount of unreacted methane
   The amount of the product (A) is determined:
   A=[2×$C_2$+3×$C_3$+4×$C_4$+5×$C_5$+6×Bz+$CO_X$]where $C_2$, $C_3$, $C_4$, $C_{51}$ Bz and $CO_X$ represents molar amounts of hydrocarbons having 2 carbon atoms, hydrocarbons having 3 carbon atoms, hydrocarbons having 4 carbon atoms, hydrocarbons having 5 carbon atoms, benzene, and a total of carbon monoxide and carbon dioxide, respectively.
   The amount of unreacted methane is determined:
   B=[1×Me] where Me represents a molar amount of unreacted methane.
(2) Selectivity to $C_2$ [S($C_2$)]=[2×$C_2$]/A×100%
   where $C_2$ and A are as defined above.
(3) Yield of $C_2$ [Y($C_2$)]=[C(M)]×[S($C_2$)]×1/100%
(4) Selectivity to $CO_X$ [S($CO_X$)]=[$CO_X$]/A×100%
(5) Yield of $CO_X$ [Y(COX)]=[C(M)]×[S($CO_X$)]×1/100%

EXAMPLE 30

Example 29 was repeated in the same manner as described except that the catalyst obtained in Example 6 was substituted for the catalyst of Example 1. The results are summarized in Table 1 together with the results of Example 29.

EXAMPLES 31–34

Example 29 was repeated in the same manner as described except that the catalyst obtained in Examples 23–26 were each substituted for the catalyst of Example 1 and that the reaction was performed at 800° C. The results are summarized in Table 1.

TABLE 1

| Example No. | Catalyst Example No. | C(M) (%) | S(C$_2$) (%) | Y(C$_2$) (%) | S(CO$_x$) (%) | Y(Co) (%) |
|---|---|---|---|---|---|---|
| 29 | 1 | 45.9 | 62.9 | 28.8 | 20.5 | 9.4 |
| 30 | 6 | 39.1 | 55.6 | 21.5 | 30.2 | 11.8 |
| 31 | 23 | 15.6 | 73.8 | 11.5 | 22.2 | 3.46 |
| 32 | 24 | 26.4 | 53.3 | 14.0 | 47.3 | 11.5 |
| 33 | 25 | 30.8 | 66.1 | 20.4 | 28.0 | 8.64 |
| 34 | 26 | 24.8 | 68.1 | 16.9 | 27.6 | 6.84 |

EXAMPLES 35 AND 36

Oxidative condensation of methane was carried out using a catalyst obtained in Example 27 at a temperature of 800° C. The yield of C$_2$ after 1 hour reaction (Example 35) was 13.6%, while the yield of C$_2$ after 100 hour reaction (Example 36) was 18.6%. Thus, the catalyst had a service life over 100 hours. The results are summarized in Table 2.

EXAMPLES 37 AND 38

Oxidative condensation of methane was carried out using 2 g of a catalyst obtained in Example 28 at a temperature of 700° C. The yield of C$_2$ after 1.5 hour reaction (Example 37) was 25.3%, while the yield of C$_2$ after 8 hour reaction (Example 38) was 26.2%. The results are summarized in Table 2. Sodium chloride was twice composited with the catalyst in the preparation of the catalyst of Example 28. Thus, the catalyst of Example 28 had an improved catalyst life.

COMPARATIVE EXAMPLES 4 AND 5

Oxidative condensation of methane was carried out using a catalyst obtained in Comparative Example 3 at a temperature of 800° C. The yield of C$_2$ after 0.5 hour reaction (Comparative Example 4) was 11.2%, while the yield of C$_2$ after 8 hour reaction (Comparative Example 5) was 6.79%. Thus, the catalyst had a poor service life. The results are summarized in Table 2.

TABLE 2

| Example No. | Reaction Time (h) | C(M) (%) | S(C$_2$) (%) | Y(C$_2$) (%) | S(CO$_x$) (%) | Y(Co) (%) |
|---|---|---|---|---|---|---|
| 35 | 1 | 30.1 | 45.2 | 13.6 | 51.8 | 15.6 |
| 36 | 100 | 33.5 | 55.4 | 18.5 | 40.0 | 13.4 |
| 37 | 1.5 | 41.2 | 61.4 | 25.3 | 18.6 | 7.67 |
| 38 | 8 | 38.4 | 68.2 | 26.2 | 19.9 | 7.62 |
| Comp. Ex. 4 | 0.5 | 13.7 | 81.4 | 11.2 | 14.6 | 2.0 |
| Comp. Ex. 5 | 8 | 8.18 | 83.0 | 6.79 | 14.4 | 1.18 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Application No. H10–58468, filed Mar. 10, 1998, inclusive of the specification and claims, are hereby incorporated by reference herein.

What is claimed is:

1. A catalyst comprising a carrier including a solid, oxide superacid and at least one transition metal compound and at least one alkali metal compound supported on said carrier.

2. A catalyst as claimed in claim 1, wherein said oxide superacid comprises an inorganic refractory oxide selected from the group consisting of aluminum oxide, hafnium oxide and zirconium oxide, and another oxide composited with said refractory oxide, wherein said another oxide is selected from the group consisting of molybdenum oxide, tungsten oxide and boron oxide.

3. A catalyst as claimed in claim 2, wherein said another oxide is present in an amount of 1–30% by weight based on the weight of said refractory oxide.

4. A catalyst as claimed in claim 2, wherein said transition metal compound and alkali metal compound are present in amounts of 0.2–50 parts by weight and 1–30 parts by weight, respectively, per 100 parts by weight of said refractory oxide.

5. A catalyst as claimed in claim 1, wherein said transition metal compound is a compound of a metal selected from the group consisting of Mn, Ti, Fe, Co, Cr, V, Ni, Si, Ce, Sm, Eu, Yb, Er, Nd, Ru, Y, Gd and La.

6. A method for oxidative condensation of a lower aliphatic hydrocarbon, comprising contacting the lower aliphatic hydrocarbon with oxygen in the presence of a catalyst comprising a carrier including a solid oxide superacid, and at least one transition metal compound and at least one alkali metal compound supported on said carrier.

7. A method as claimed in claim 6, wherein said contact is performed at a temperature of 600–900° C.

8. A method as claimed in claim 7, wherein said another oxide is present in an amount of 1–30% by weight based on the weight of said refractory oxide.

9. A method as claimed in claim 7, wherein said transition metal compound and alkali metal compound are present in amounts of 0.2–50 parts by weight and 1–30 parts by weight, respectively, per 100 parts by weight of said refractory oxide.

10. A method as claimed in claim 6, wherein said oxygen is used in an amount of 0.1–10 mol per mol of said aliphatic hydrocarbon.

11. A method as claimed in claim 6, wherein said aliphatic hydrocarbon is methane.

12. A method as claimed in claim 6, wherein said oxide superacid comprises an inorganic refractory oxide selected from the group consisting of aluminum oxide, hafnium oxide and zirconium oxide, and another oxide composited with said refractory oxide, wherein said another oxide is selected from the group consisting of molybdenum oxide, tungsten oxide and boron oxide.

13. A method as claimed in claim 6, wherein said transition metal compound is a compound of a metal selected from the group consisting of Mn, Ti, Fe, Co, Cr, V, Ni, Si, Ce, Sm, Eu, Yb, Er, Nd, Ru, Y, Gd and La.

* * * * *

UNITED STATES PATENT AND TRADEMARK OFFICE
CERTIFICATE OF CORRECTION

PATENT NO.   : 6,071,849
DATED        : June 6, 2000
INVENTOR(S)  : Murata et al.

It is certified that error appears in the above-identified patent and that said Letters Patent is hereby corrected as shown below:

Column 7,
Lines 15 and 55, "Y(Co)" should read -- Y(COx) --.

Signed and Sealed this

Sixteenth Day of October, 2001

Attest:

NICHOLAS P. GODICI
Attesting Officer   Acting Director of the United States Patent and Trademark Office